US010238200B2

(12) United States Patent
Bartlett

(10) Patent No.: US 10,238,200 B2
(45) Date of Patent: Mar. 26, 2019

(54) DEPILATORY WAX MELTING APPARATUS

(71) Applicant: April Bartlett, Seattle, WA (US)

(72) Inventor: April Bartlett, Seattle, WA (US)

( * ) Notice: Subject to any disclaimer, the term of this patent is extended or adjusted under 35 U.S.C. 154(b) by 0 days.

(21) Appl. No.: 15/692,083

(22) Filed: Aug. 31, 2017

(65) Prior Publication Data

US 2018/0070698 A1    Mar. 15, 2018

Related U.S. Application Data

(60) Provisional application No. 62/394,367, filed on Sep. 14, 2016, provisional application No. 62/489,606, filed on Apr. 25, 2017.

(51) Int. Cl.
| | |
|---|---|
| *A61L 9/03* | (2006.01) |
| *A45D 26/00* | (2006.01) |
| *H05B 3/10* | (2006.01) |
| *G05D 23/24* | (2006.01) |
| *G05D 23/19* | (2006.01) |

(52) U.S. Cl.
CPC ..... *A45D 26/0014* (2013.01); *G05D 23/2401* (2013.01); *H05B 3/10* (2013.01); *G05D 23/1912* (2013.01)

(58) Field of Classification Search
CPC .......... G05D 23/2401; G05D 23/1912; A45D 26/0014; A45D 2200/155; H05B 3/10; A47G 19/2288; A47G 19/20
USPC ..................... 222/146.5; 219/421, 433; 401/1
See application file for complete search history.

(56) References Cited

U.S. PATENT DOCUMENTS

| | | | | |
|---|---|---|---|---|
| 4,731,522 A | * | 3/1988 | Manchester | A01M 1/2077 219/433 |
| 4,889,302 A | * | 12/1989 | Tucker | A47G 23/0216 215/12.2 |
| 4,980,539 A | | 12/1990 | Walton | |
| D333,883 S | | 3/1993 | Mann | |
| 5,395,175 A | * | 3/1995 | Bontoux | A45D 26/0014 401/1 |
| 5,523,537 A | | 6/1996 | Johannes et al. | |
| 5,847,363 A | | 12/1998 | Debourg et al. | |
| 6,053,649 A | | 4/2000 | Ronai | |
| 6,362,460 B1 | * | 3/2002 | Fraker | A45D 44/00 219/385 |
| 6,503,459 B1 | * | 1/2003 | Leonard | A01M 1/2088 422/120 |
| 6,627,857 B1 | * | 9/2003 | Tanner | A61L 9/03 219/445.1 |
| 6,935,535 B2 | | 8/2005 | Pandolfi et al. | |
| 7,133,605 B2 | * | 11/2006 | Niemeyer | A61L 9/03 392/390 |
| 7,419,281 B2 | * | 9/2008 | Porchia | A61L 9/03 362/253 |
| 7,910,860 B2 | * | 3/2011 | Irvin | A45D 34/00 219/201 |
| 8,216,291 B1 | * | 7/2012 | Leventhal | A61H 23/02 607/104 |

(Continued)

*Primary Examiner* — Charles P Cheyney
(74) *Attorney, Agent, or Firm* — Ruttler Mills, PLLC; James J. Ruttler

(57) ABSTRACT

An apparatus for the melting of depilatory wax, the apparatus comprising: a housing including at least: a receptacle; a heating element in thermal contact with the receptacle; and a control mechanism operable to control the heating element; and a removable skin that is removably placeable on the housing to protect the housing from wax deposits.

14 Claims, 14 Drawing Sheets

(56) References Cited

U.S. PATENT DOCUMENTS

| | | | |
|---|---|---|---|
| 8,882,378 B2* | 11/2014 | Bylsma | A45D 34/04 |
| | | | 401/1 |
| 9,498,553 B2* | 11/2016 | Hsiao | A61L 9/03 |
| 9,743,463 B2* | 8/2017 | Laghi | B05B 9/002 |
| 9,756,567 B2 | 9/2017 | Morioka | |
| 9,877,605 B2* | 1/2018 | Clark | A47G 19/2288 |
| 2004/0037608 A1* | 2/2004 | Cochran | A45D 26/0014 |
| | | | 401/1 |
| 2004/0136888 A1* | 7/2004 | Shimizu | A61L 9/03 |
| | | | 422/305 |
| 2005/0016985 A1 | 1/2005 | Haas et al. | |
| 2014/0110389 A1* | 4/2014 | Hsiao | A61L 9/03 |
| | | | 219/385 |
| 2015/0109823 A1* | 4/2015 | Hsiao | A61L 9/03 |
| | | | 362/643 |
| 2015/0117056 A1* | 4/2015 | Hsiao | F21V 33/0004 |
| | | | 362/611 |
| 2015/0223292 A1* | 8/2015 | Duffield | A01M 1/2061 |
| | | | 219/634 |
| 2015/0283280 A1* | 10/2015 | Belongia | A61L 9/03 |
| | | | 392/386 |
| 2017/0274405 A1* | 9/2017 | Lucas | B05B 17/0646 |

* cited by examiner

DEPILATORY WAX MELTING APPARATUS

PRIORITY CLAIM

This application claims the benefit of and/or is a non-provisional of U.S. Provisional Patent Application 62/489,606 filed Apr. 25, 2017 and U.S. Provisional Patent Application 62/394,367 filed Sep. 14, 2016. The foregoing application isincorporated by reference in its entirety as if fully set forth herein.

FIELD OF THE INVENTION

This invention relates generally to consumer product and, more specifically, to a depilatory wax melting apparatus.

SUMMARY

In one embodiment, a depilatory wax melting apparatus includes, but is not limited to: a housing that includes at least a receptacle, a heating element in thermal contact with the receptacle, a control mechanism operable to control the heating element, and a removable skin that is removably placeable on the housing to protect the housing from wax deposits.

In one embodiment, the apparatus is approximately spherical and is formed from metal, plastic, wood, composite, or other similar material and has dimensions of approximately three inches in radius with a one-inch spherical cap removed on its top side which exposes an approximately cylindrical receptacle approximately two inches in radius that is flush with the flat surface created by the removed spherical cap, and a second spherical cap removed on its bottom side to provide a level surface for resting on objects. The apparatus is approximately four inches tall. The apparatus has a control panel located at its equator on the front side, the panel can have a multitude of different control configurations depending on the embodiment, but in one such embodiment the control panel consists of a circular button surrounded by a second ring button. The apparatus includes a heating element located inside the structure and in thermal contact with the receptacle.

In some embodiments, the apparatus comes paired with an outer skin layer that may be comprised of a variety of materials including, but not limited to, plastics and silicone compounds, wherein the outer skin envelops the apparatus to protect it from dripping wax as it is being removed from the receptacle The particulars shown herein are by way of example. In this regard, no attempt is made to show structural details of the invention in more detail than is necessary for the fundamental understanding of the invention. The description taken with the drawings and/or examples make apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

Specific elements of any foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

While preferred and alternate embodiments have been illustrated and described, as noted above, many changes can be made without departing from the spirit and scope of the disclosure. Accordingly, the inventive concept is not limited by the disclosure of these preferred and alternate embodiments.

BRIEF DESCRIPTION OF THE DRAWINGS

Embodiments of the present invention are described in detail below with reference to the following drawings.

DETAILED DESCRIPTION

This invention relates generally to a consumer product and, more specifically, to depilatory wax melting apparatus.

Specific details of certain embodiments of the invention are set forth in the following description and in FIGS. 1-14 to provide a thorough understanding of such embodiments. The present invention may have additional embodiments, may be practiced without one or more of the details described for any particular described embodiment, or may have any detail described for one particular embodiment practiced with any other detail described for another embodiment.

Figure 1:
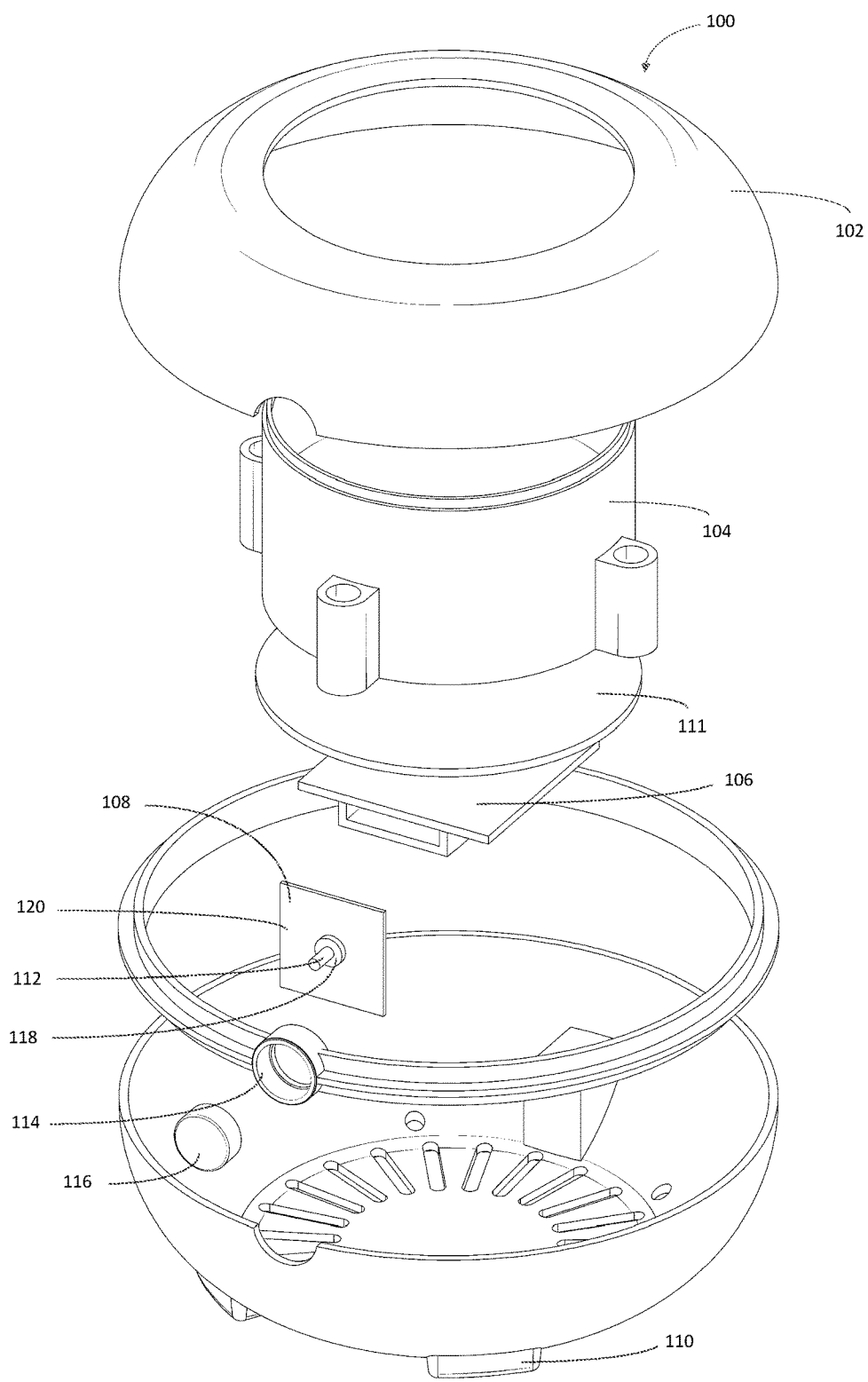
FIG. 1 is an isometric, exploded perspective of a depilatory wax melting apparatus, in accordance with an embodiment of the invention.

FIG. 1 is an isometric, exploded perspective of a depilatory wax melting apparatus, in accordance with an embodiment of the invention.

In one embodiment, a depilatory wax melting apparatus 100 includes, but is not limited to: a housing 102 that includes at least a receptacle 104, a heating element 106 in thermal contact with the receptacle 104, a control mechanism 108 operable to control the heating element 106, and a removable skin that is removably placeable on the housing 102 to protect the housing from wax deposits.

The housing 102 may be of any three-dimensional polygonal shape, chosen from, but not limited to, the following: cube, sphere, dome, pyramid, cylinder, cuboid, cone, or prism. The housing 102 may be comprised of a multitude of materials including, but not limited to, metals, plastics, polymers, woods, or ceramics. The housing 102 may be comprised of one or more independent pieces that form a shape. The housing 102 may be approximately two inches to one foot wide and two inches to one foot tall. The housing 102 may include one or more lights that may be colored or able to change color. The housing 102 may include one or more feet 110 for stabilizing the apparatus.

The receptacle 104 may be of any three-dimensional polygonal shape, chosen from, but not limited to, the following: cube, sphere, dome, pyramid, cuboid, cylinder, cone, or prism. The receptacle 104 may be comprised of a multitude of materials including, but not limited to, metals, plastics, polymers, woods, or ceramics. The receptacle 104 may be one inch to one foot wide and one inch to one foot tall.

The heating element 106 may be of any shape chosen from, but not limited to, the following: circle, square, triangle, rectangle, polygon, cube, sphere, dome, pyramid, cuboid, cylinder, cone, or prism. The heating element 106 may be in thermal contact with the bottom of the receptacle 104. The heating element 106 may conform to the shape of the receptacle 104. The heating element 106 may be powered by an external power source such as a cable, alternatively the heating element 106 may be powered by an internal power source such as a battery. The heating element 106 may be one inch to six inches wide and from one millimeter to one inch tall. The heating element 106 may be separated from the receptacle 104 by an aluminum plate 111 or other heat conductive material.

In certain embodiments, the removable skin envelopes the entire housing 102 except for the control mechanism 108 and opening of the receptacle 104. The removable skin may additionally envelope the control mechanism 108 and have inputs for the control mechanism 108 integrated into its structure. The removable skin may removably cover the opening of the receptacle 104 as a lid. The removable skin may be one quarter millimeter to two centimeters thick. In certain embodiments, the removable skin is partially porous. In some embodiments, the removable skin has a texture and/or is comprised of a material that enables it to be self-cleaning. In certain embodiments, the removable skin is comprised of a temperature sensitive material which changes color upon reaching a certain temperature, alerting users when the wax inside has fully melted or is reaching too high of a temperature.

In certain embodiments, the removable skin is shaped to conform to the shape of the housing 102. In other embodiments, the removable skin is shaped such that it drapes over the housing 102 loosely.

In certain embodiments, the removable skin is comprised of a flexible polymer material such as, but not limited to: silicone, plastic or other elastomers. In other embodiments, the removable skin is comprised of a material such as, but not limited to: paper, cardboard, or wood.

In certain embodiments, the removable skin is secured to the portion of the receptacle 104 that is exposed by attaching to the rim of the receptacle 104 via an integrated flange on the skin which forms a seal on the rim of the receptacle 104. In another embodiment, the removable skin is secured to the housing by an integrated latch in the housing 102 which pinches a portion of the removable skin and secures it. In another embodiment, the removable skin is secured by wrapping around the edge of the housing 102 and adhering to the housing 102 through elastic friction. In other embodiments, the removable skin is secured to the housing 102 by being clamped between two pieces or more of the housing 102.

In certain embodiments, the removable skin may be characterized by one of, but is not limited to, the following shapes: cube, sphere, dome, pyramid, cuboid, cone, cylinder, or prism.

In one embodiment, the control mechanism 108 includes external controls 112 which may be characterized by, but is not limited to, buttons, switches, dials, arrows, touch-sensitive, or levers. The control mechanism 108 may include an integrated antenna for sending and receiving radio signals. The control mechanism 108 may include a digital, visual, and/or analog display. The control mechanism 108 may include one or more lights 114 that may be colored or able to change color. The control mechanism 108 control components may be one millimeter to one inch wide and one millimeter to one inch tall. The control mechanism 108 may be one centimeter wide to six inches wide and one centimeter to six inches tall. The external controls 112 may be flush with the control mechanism 108, recessed up to one inch into the housing 102, or extend up to one inch out of the housing 102.

The external controls 112, for example, may comprise a circular on and off button 116 which is circumscribed by a circular temperature control input 118. The temperature control input 118 may be controlled by touch-sense wherein the user moves their finger around the circle, which in turn increases or decreases the temperature depending on whether the user's finger moved clockwise or counterclockwise respectively. Alternatively, the user may press on one side to increase the temperature, or the other to decrease it. Alternatively, temperature control input 118 may be the same button as the one and off button 116, with temperature being controlled by turning the button.

In certain embodiments, the computer processing component 120 is able to detect the amount of wax in the receptacle 104 through weight or fluid level data, processes that data to determine if it has become too low, and then instructs the control mechanism 108 to inform the user of the low level and/or interface with a computer and instruct it to provide additional wax, automatically order additional wax, and/or notify the user of the need for additional wax. In some embodiments, if the wax in the receptacle 104 reaches one third of its maximum level, the computer processing component 120 will interpret that data and will instruct a communications component to communicate with an automated system, such as Amazon's Alexa, to order additional wax. In some embodiments, if the wax in the receptacle 104 reaches one third of its maximum level, the computer processing component 120 will interpret that data and will instruct a communications component to communicate with a user via an application downloaded onto their phone, and/or to send a text or SMS message to that user's phone, alerting them of the low wax.

In one embodiment, the invention comprises a method of controlling a computer processing component 120 by instructing it to perform operations comprising, but not limited to: determining when to activate based on one or more first parameters, turning on the heating element 106 based on a determination of when to activate, controlling the temperature of the heating element 106 based on one or more second parameters, and deactivating the heating element 106 based upon one or more third parameters.

In certain embodiments, the computer processing component 120 is able to detect the temperature of the wax and/or receptacle 104, processes that temperature data to determine if it has become too hot or too cool, and then instructs the heating element 106 to adjust the temperature as needed. In another embodiment, the computer processing component 120 sends instructions to a computer and/or application to inform a user that that receptacle 104 has reached a certain temperature. In another embodiment, the computer processing component 120 interprets the temperature data and instructs a display to show the current temperature of the receptacle. In another embodiment, the computer processing component 120 interprets the temperature data and instructs a connected light to turn on and/or off to signal the reaching of a certain temperature, and/or instruct a connected light to change to a specific color to indicate the reaching of a certain temperature.

In certain embodiments, the computer processing component 120 is able to detect the current time based on an integrated timer, processes that data, and then instructs the control mechanism 108 to turn the apparatus 100 and/or heating element 106 on or off, and/or activate or deactivate the apparatus 100 depending on the data from said timer. In some embodiments, the computer processing component 120 detects the current time based on the integrated timer, compares it to a previous check of the time, and instructs the device to turn on or off if a certain amount of time has elapsed. In some embodiments, a user may use an application on their mobile phone or computer to set the timer for a period of time, such as one hour, during which the device will activate, and once the computer processing component 120 is informed by the timer that one hour has elapsed, it will instruct the apparatus 100 to turn off.

In certain embodiments, the computer processing component 120 is able to interpret a programmed schedule, processes that data, and then instructs the control mechanism 108 to turn the apparatus 100 and/or heating element 106 on or off, and/or activate or deactivate the apparatus 100 depending on the programmed schedule. In some embodiments, a user is able to create a program schedule using a mobile phone or computer, and then transmit the program schedule to the apparatus 100, where the computer processing component 120 will interpret the schedule and instruct the device and/or heating element 106 to turn on or off, or modify the heating element's 106 temperature, based on the programmed schedule. In some embodiments, the programmed schedule set by a user may correspond to the hours the user's business is open, such that the computer processing component 120 interprets the program schedule and activates the apparatus 100 at the time of the business's opening, or prior if necessary, and then deactivates the apparatus 100 upon the close of business for the day. In said embodiment the schedule may also include instructions to modulate the heating element's 106 temperature to keep the wax from drying or reaching too high of a temperature.

In certain embodiments, the computer processing component 120 is able to detect data from a proximity sensor, processes that data, and then instructs the control mechanism 108 to turn the apparatus 100 and/or heating element 106 on or off, and/or activate or deactivate the apparatus 100 depending on the data. In some embodiments, the computer processing component 120 will detect when a person leaves proximity of the apparatus 100 and send the control mechanism instructions to deactivate the device and/or send instructions to the heating element 106 to reduce the temperature so that power is not unnecessarily consumed and/or for safety purposes.

In certain embodiments, the computer processing component 120 is able to detect data from a motion sensor, processes that data, and then instructs the control mechanism 108 to turn the apparatus 100 and/or heating element 106 on or off, and/or activate or deactivate the apparatus 100 depending on the data. In some embodiments, the motion sensor detects motion data, such as the door to the place of business opening, the computer processing component 120 interprets the motion data, and the computer processing component 120 then instructs the control mechanism 108 to activate the device and/or increase the temperature. In some embodiments, if the motion sensor detects no motion for a specified period of time, the computer processing component 120 will interpret that data and instruct the control mechanism 108 to deactivate the device and/or instruct the heating element 106 to reduce the temperature.

In certain embodiments, the computer processing component 120 is able to detect data from a light sensor, processes that data, and then instructs the control mechanism 108 to turn the apparatus 100 and/or heating element 106 on or off, and/or activate or deactivate the apparatus 100 depending on the data. In some embodiments, a light sensor detects the presence of light, such as a business's light being turned on, and transmits that data to the computer processing component 120, and the computer processing component 120 interprets the data and instructs the control mechanism 108 to activate the apparatus 100. In some embodiments, a light sensor detects the absence of light, such as a business's light being turned off, and transmits that data to the computer processing component 120, and the computer processing component 120 interprets the data and instructs the control mechanism 108 to deactivate the apparatus 100.

In certain embodiments, the computer processing component 120 is able to detect data from a sound sensor, processes that data, and then instructs the control mechanism 108 to turn the apparatus 100 and/or heating element 106 on or off, and/or activate or deactivate the apparatus 100 depending on the data. In some embodiments, the sound sensor detects sound above a certain decibel range and transmits that data to the computer processing component 120, which interprets that data and instructs the device to activate. In some embodiments, the sound sensor detects sound of a specific wavelength and frequency, such as specified command, and the computer processing component 120 detects this data, interprets the sound wavelength and frequency, and if it matches the specified command, transmits instructions to the control mechanism to activate for one command, or deactivate for another. The temperature may also be controlled through specified commands through this same method.

In certain embodiments, the computer processing component 120 is able to detect whether a light switch is turned on or off, processes that data, and then instructs the control mechanism 108 to turn the apparatus 100 and/or heating element 106 on or off, and/or activate or deactivate the apparatus 100 depending on the data. In some embodiments, a switch, such as the light switch in a business, is connected directly or wirelessly to the apparatus 100, and when it is turned on or off, the computer processing component 120 interprets that change and sends the control mechanism 108 instructions to activate or deactivate the apparatus 100 respectively.

In certain embodiments, the computer processing component 120 is able to detect user input through the control mechanism 108, processes that data to determine whether a connected light should be turned on or off and/or the color of the light should be changed, and then instructs the light to turn on or off or change color depending on the input data. In some embodiments, the user uses an application on their mobile phone or computer to transmit instructions to change the color of one or more attached lights, activate or deactivate one or more attached lights, to the computer processing component 120, which then interprets the instructions and instructs the control mechanism 108 to change the color of, activate, or deactivate the lights depending on the instructions. For example, the user can input into the application a request to change the light to a blue color, the computer processing component 120 will receive that command, interpret it, and instruct the control mechanism to change one or more attached lights to be blue in color.

Figure 2:
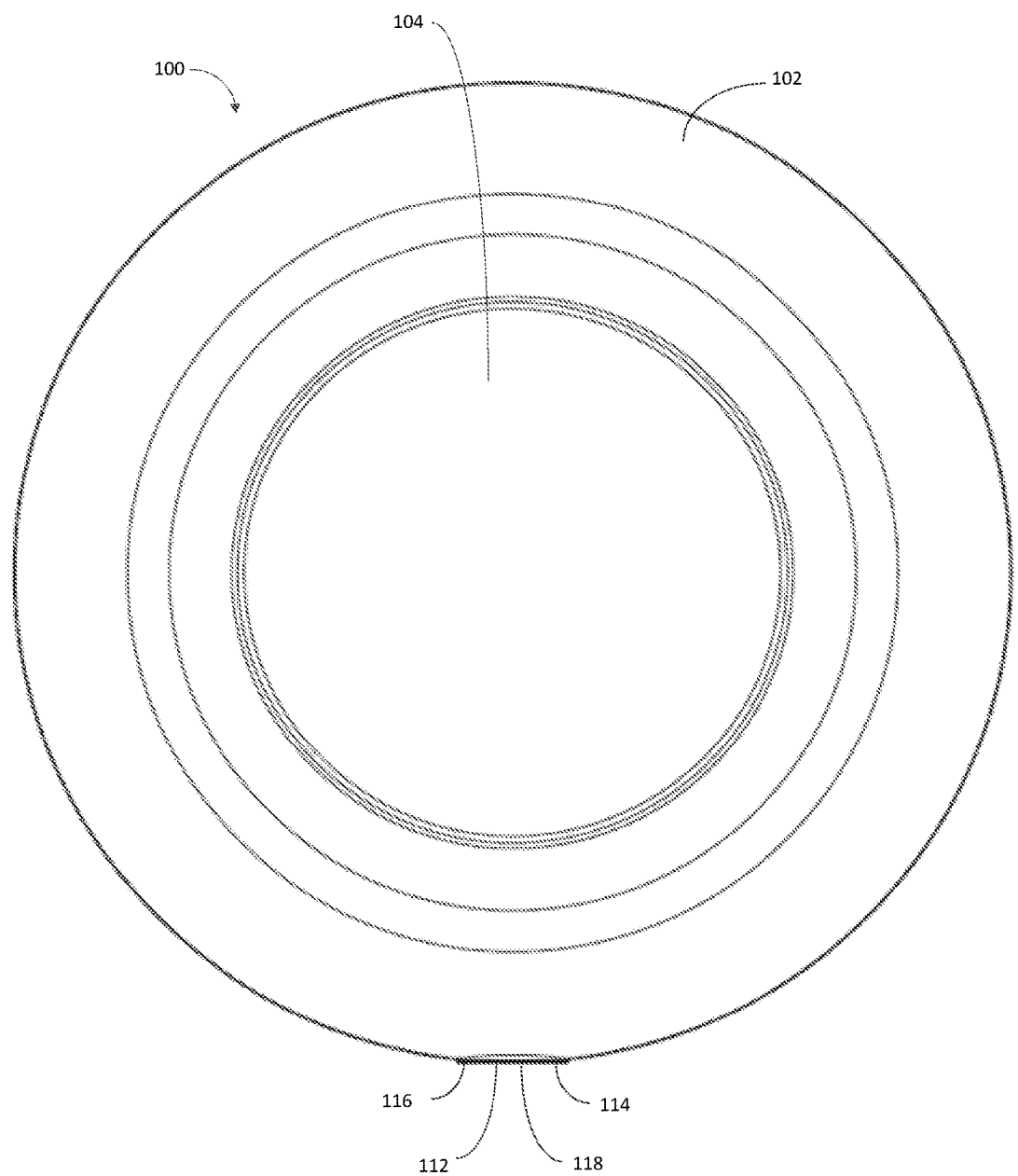
FIG. 2 is a top perspective of a depilatory wax melting apparatus, in accordance with an embodiment of the invention.

FIG. 2 is a top perspective of a depilatory wax melting apparatus, in accordance with an embodiment of the invention.

In one embodiment, a depilatory wax melting apparatus 100 includes, but is not limited to: a housing 102 that includes at least a receptacle 104, a heating element in thermal contact with the receptacle 104, and a control mechanism operable to control the heating element; and a removable skin that is removably placeable on the housing 102 to protect the housing from wax deposits.

The housing 102 may be of any three-dimensional polygonal shape, chosen from, but not limited to, the following: cube, sphere, dome, pyramid, cylinder, cuboid, cone, or prism. The housing 102 may be comprised of a multitude of materials including, but not limited to, metals, plastics, polymers, woods, or ceramics. The housing 102 may be comprised of one or more independent pieces that form a shape. The housing 102 may be approximately two inches to one foot wide and two inches to one foot tall. The housing 102 may include one or more lights that may be colored or able to change color. The housing 102 may include one or more feet for stabilizing the apparatus.

The receptacle 104 may be of any three-dimensional polygonal shape, chosen from, but not limited to, the following: cube, sphere, dome, pyramid, cuboid, cylinder, cone, or prism. The receptacle 104 may be comprised of a multitude of materials including, but not limited to, metals, plastics, polymers, woods, or ceramics. The receptacle 104 may be one inch to one foot wide and one inch to one foot tall.

The heating element may be of any shape chosen from, but not limited to, the following: circle, square, triangle, rectangle, polygon, cube, sphere, dome, pyramid, cuboid, cylinder, cone, or prism. The heating element may be in thermal contact with the bottom of the receptacle 104. The heating element may conform to the shape of the receptacle 104. The heating element may be powered by an external power source such as a cable, alternatively the heating element may be powered by an internal power source such as a battery. The heating element may be one inch to six inches wide and from one millimeter to one inch tall. The heating element may be separated from the receptacle 104 by an aluminum plate or other heat conductive material.

In certain embodiments, the removable skin envelopes the entire housing 102 except for the control mechanism and opening of the receptacle 104. The removable skin may additionally envelope the control mechanism and have inputs for the control mechanism integrated into its structure. The removable skin may removably cover the opening of the receptacle 104 as a lid. The removable skin may be one quarter millimeter to two centimeters thick. In certain embodiments, the removable skin is partially porous. In some embodiments, the removable skin has a texture and/or is comprised of a material that enables it to be self-cleaning. In certain embodiments, the removable skin is comprised of a temperature sensitive material which changes color upon reaching a certain temperature, alerting users when the wax inside has fully melted or is reaching too high of a temperature.

In certain embodiments, the removable skin is shaped to conform to the shape of the housing 102. In other embodiments, the removable skin is shaped such that it drapes over the housing 102 loosely.

In certain embodiments, the removable skin is comprised of a flexible polymer material such as, but not limited to: silicone, plastic or other elastomers. In other embodiments, the removable skin is comprised of a material such as, but not limited to: paper, cardboard, or wood.

In certain embodiments, the removable skin is secured to the portion of the receptacle 104 that is exposed by attaching to the rim of the receptacle 104 via an integrated flange on the skin which forms a seal on the rim of the receptacle 104. In another embodiment, the removable skin is secured to the housing by an integrated latch in the housing 102 which pinches a portion of the removable skin and secures it. In another embodiment, the removable skin is secured by wrapping around the edge of the housing 102 and adhering to the housing 102 through elastic friction. In other embodiments, the removable skin is secured to the housing 102 by being clamped between two pieces or more of the housing 102.

In certain embodiments, the removable skin may be characterized by one of, but is not limited to, the following shapes: cube, sphere, dome, pyramid, cuboid, cone, cylinder, or prism.

In one embodiment, the control mechanism includes external controls 112 which may be characterized by, but is not limited to, buttons, switches, dials, arrows, touch-sensitive, or levers. The control mechanism may include an integrated antenna for sending and receiving radio signals. The control mechanism may include a digital, visual, and/or analog display. The control mechanism may include one or more lights 114 that may be colored or able to change color. The control mechanism control components may be one millimeter to one inch wide and one millimeter to one inch tall. The control mechanism may be one centimeter wide to six inches wide and one centimeter to six inches tall. The external controls 112 may be flush with the control mechanism 108, recessed up to one inch into the housing 102, or extend up to one inch out of the housing 102.

The external controls 112, for example, may comprise a circular on and off button 116 which is circumscribed by a circular temperature control input 118. The temperature control input 118 may be controlled by touch-sense wherein the user moves their finger around the circle, which in turn increases or decreases the temperature depending on whether the user's finger moved clockwise or counterclockwise respectively. Alternatively, the user may press on one side to increase the temperature, or the other to decrease it. Alternatively, temperature control input 118 may be the same button as the one and off button 116, with temperature being controlled by turning the button.

Figure 3:
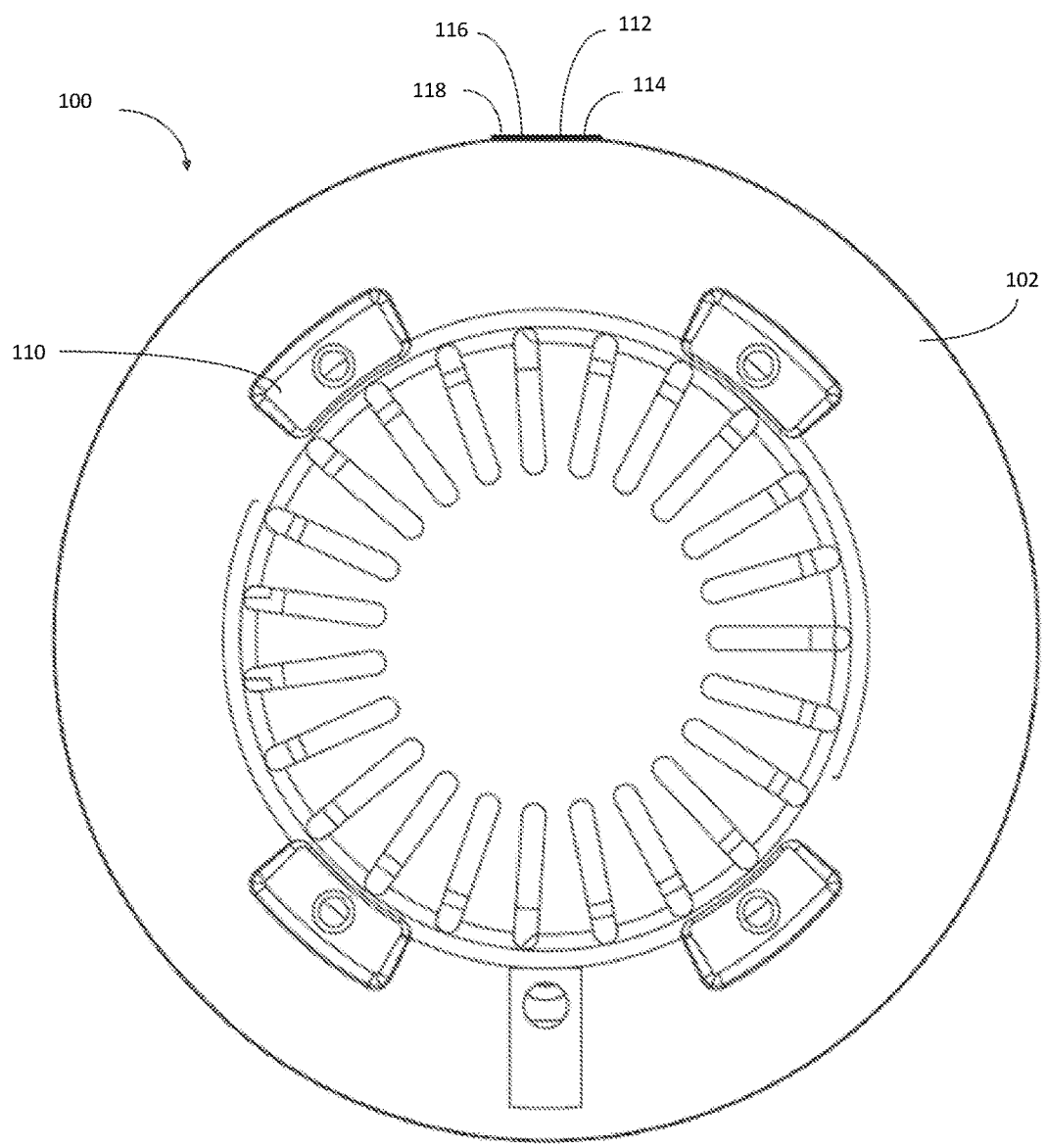
FIG. 3 is a bottom perspective of a depilatory wax melting apparatus, in accordance with an embodiment of the invention.

FIG. 3 is a bottom perspective of a depilatory wax melting apparatus, in accordance with an embodiment of the invention.

In one embodiment, a depilatory wax melting apparatus 100 includes, but is not limited to: a housing 102 that includes at least a receptacle, a heating element in thermal contact with the receptacle, and a control mechanism operable to control the heating element; and a removable skin that is removably placeable on the housing 102 to protect the housing from wax deposits.

The housing 102 may be of any three-dimensional polygonal shape, chosen from, but not limited to, the following: cube, sphere, dome, pyramid, cylinder, cuboid, cone, or prism. The housing 102 may be comprised of a multitude of materials including, but not limited to, metals, plastics, polymers, woods, or ceramics. The housing 102 may be comprised of one or more independent pieces that form a shape. The housing 102 may be approximately two inches to one foot wide and two inches to one foot tall. The housing 102 may include one or more lights that may be colored or able to change color. The housing 102 may include one or more feet 110 for stabilizing the apparatus.

The receptacle may be of any three-dimensional polygonal shape, chosen from, but not limited to, the following: cube, sphere, dome, pyramid, cuboid, cylinder, cone, or prism. The receptacle may be comprised of a multitude of materials including, but not limited to, metals, plastics, polymers, woods, or ceramics. The receptacle may be one inch to one foot wide and one inch to one foot tall.

The heating element may be of any shape chosen from, but not limited to, the following: circle, square, triangle, rectangle, polygon, cube, sphere, dome, pyramid, cuboid, cylinder, cone, or prism. The heating element may be in thermal contact with the bottom of the receptacle. The heating element may conform to the shape of the receptacle. The heating element may be powered by an external power source such as a cable, alternatively the heating element may be powered by an internal power source such as a battery. The heating element may be one inch to six inches wide and from one millimeter to one inch tall. The heating element may be separated from the receptacle by an aluminum plate or other heat conductive material.

In certain embodiments, the removable skin envelopes the entire housing 102 except for the control mechanism and opening of the receptacle. The removable skin may additionally envelope the control mechanism and have inputs for the control mechanism integrated into its structure. The removable skin may removably cover the opening of the receptacle as a lid. The removable skin may be one quarter millimeter to two centimeters thick. In certain embodiments, the removable skin is partially porous. In some embodiments, the removable skin has a texture and/or is comprised of a material that enables it to be self-cleaning. In certain embodiments, the removable skin is comprised of a temperature sensitive material which changes color upon reaching a certain temperature, alerting users when the wax inside has fully melted or is reaching too high of a temperature.

In certain embodiments, the removable skin is shaped to conform to the shape of the housing 102. In other embodiments, the removable skin is shaped such that it drapes over the housing 102 loosely.

In certain embodiments, the removable skin is comprised of a flexible polymer material such as, but not limited to: silicone, plastic or other elastomers. In other embodiments, the removable skin is comprised of a material such as, but not limited to: paper, cardboard, or wood.

In certain embodiments, the removable skin is secured to the portion of the receptacle that is exposed by attaching to the rim of the receptacle via an integrated flange on the skin which forms a seal on the rim of the receptacle. In another embodiment, the removable skin is secured to the housing by an integrated latch in the housing 102 which pinches a portion of the removable skin and secures it. In another embodiment, the removable skin is secured by wrapping around the edge of the housing 102 and adhering to the housing 102 through elastic friction. In other embodiments, the removable skin is secured to the housing 102 by being clamped between two pieces or more of the housing 102.

In certain embodiments, the removable skin may be characterized by one of, but is not limited to, the following shapes: cube, sphere, dome, pyramid, cuboid, cone, cylinder, or prism.

In one embodiment, the control mechanism includes external controls 112 which may be characterized by, but is not limited to, buttons, switches, dials, arrows, touch-sensitive, or levers. The control mechanism may include an integrated antenna for sending and receiving radio signals. The control mechanism may include a digital, visual, and/or analog display. The control mechanism may include one or more lights 114 that may be colored or able to change color. The control mechanism control components may be one millimeter to one inch wide and one millimeter to one inch tall. The control mechanism may be one centimeter wide to six inches wide and one centimeter to six inches tall. The external controls 112 may be flush with the control mechanism 108, recessed up to one inch into the housing 102, or extend up to one inch out of the housing 102.

The external controls 112, for example, may comprise a circular on and off button 116 which is circumscribed by a circular temperature control input 118. The temperature control input 118 may be controlled by touch-sense wherein the user moves their finger around the circle, which in turn increases or decreases the temperature depending on whether the user's finger moved clockwise or counterclockwise respectively. Alternatively, the user may press on one side to increase the temperature, or the other to decrease it. Alternatively, temperature control input 118 may be the same button as the one and off button 116, with temperature being controlled by turning the button.

Figure 4:
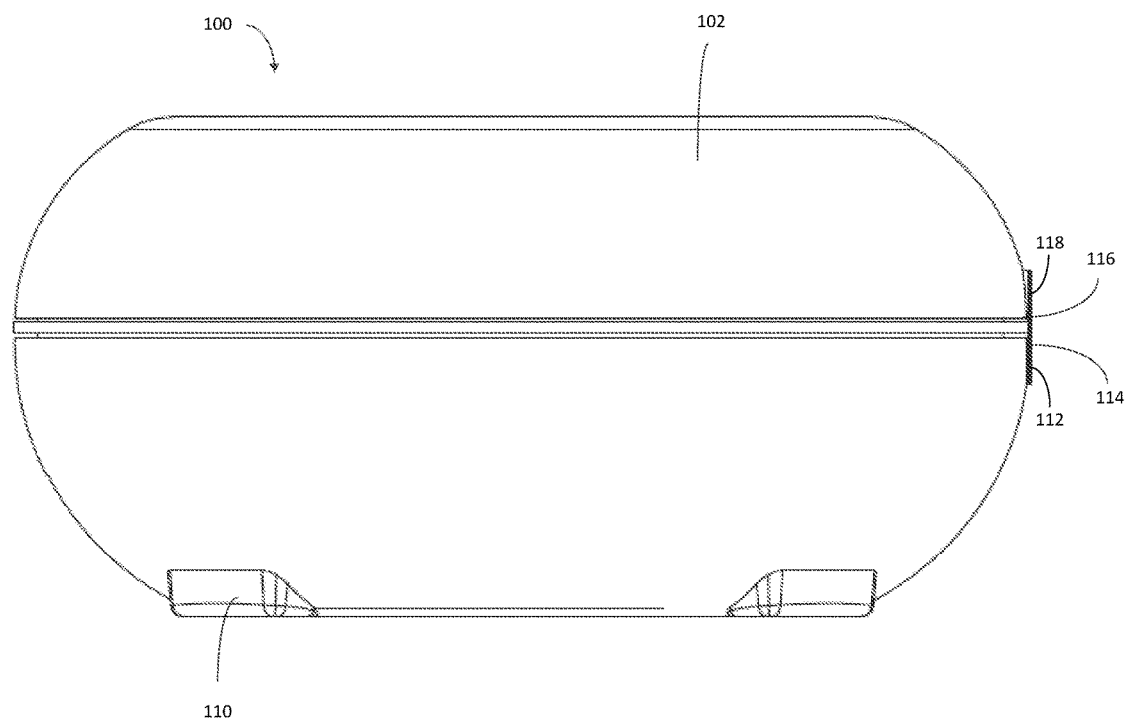
FIG. 4 is a left-side perspective of a depilatory wax melting apparatus, in accordance with an embodiment of the invention.

FIG. 4 is a left-side perspective of a depilatory wax melting apparatus, in accordance with an embodiment of the invention.

In one embodiment, a depilatory wax melting apparatus 100 includes, but is not limited to: a housing 102 that includes at least a receptacle, a heating element in thermal contact with the receptacle, and a control mechanism operable to control the heating element; and a removable skin that is removably placeable on the housing 102 to protect the housing from wax deposits.

The housing 102 may be of any three-dimensional polygonal shape, chosen from, but not limited to, the following: cube, sphere, dome, pyramid, cylinder, cuboid, cone, or prism. The housing 102 may be comprised of a multitude of materials including, but not limited to, metals, plastics, polymers, woods, or ceramics. The housing 102 may be comprised of one or more independent pieces that form a shape. The housing 102 may be approximately two inches to one foot wide and two inches to one foot tall. The housing 102 may include one or more lights that may be colored or able to change color. The housing 102 may include one or more feet 110 for stabilizing the apparatus.

The receptacle may be of any three-dimensional polygonal shape, chosen from, but not limited to, the following: cube, sphere, dome, pyramid, cuboid, cylinder, cone, or prism. The receptacle may be comprised of a multitude of materials including, but not limited to, metals, plastics, polymers, woods, or ceramics. The receptacle may be one inch to one foot wide and one inch to one foot tall.

The heating element may be of any shape chosen from, but not limited to, the following: circle, square, triangle, rectangle, polygon, cube, sphere, dome, pyramid, cuboid, cylinder, cone, or prism. The heating element may be in thermal contact with the bottom of the receptacle. The heating element may conform to the shape of the receptacle. The heating element may be powered by an external power source such as a cable, alternatively the heating element may be powered by an internal power source such as a battery. The heating element may be one inch to six inches wide and from one millimeter to one inch tall. The heating element may be separated from the receptacle by an aluminum plate or other heat conductive material.

In certain embodiments, the removable skin envelopes the entire housing 102 except for the control mechanism and opening of the receptacle. The removable skin may additionally envelope the control mechanism and have inputs for the control mechanism integrated into its structure. The removable skin may removably cover the opening of the receptacle as a lid. The removable skin may be one quarter millimeter to two centimeters thick. In certain embodiments, the removable skin is partially porous. In some embodiments, the removable skin has a texture and/or is comprised of a material that enables it to be self-cleaning. In certain embodiments, the removable skin is comprised of a temperature sensitive material which changes color upon reaching a certain temperature, alerting users when the wax inside has fully melted or is reaching too high of a temperature.

In certain embodiments, the removable skin is shaped to conform to the shape of the housing 102. In other embodiments, the removable skin is shaped such that it drapes over the housing 102 loosely.

In certain embodiments, the removable skin is comprised of a flexible polymer material such as, but not limited to: silicone, plastic or other elastomers. In other embodiments, the removable skin is comprised of a material such as, but not limited to: paper, cardboard, or wood.

In certain embodiments, the removable skin is secured to the portion of the receptacle that is exposed by attaching to the rim of the receptacle via an integrated flange on the skin which forms a seal on the rim of the receptacle. In another embodiment, the removable skin is secured to the housing by an integrated latch in the housing 102 which pinches a portion of the removable skin and secures it. In another embodiment, the removable skin is secured by wrapping around the edge of the housing 102 and adhering to the housing 102 through elastic friction. In other embodiments, the removable skin is secured to the housing 102 by being clamped between two pieces or more of the housing 102.

In certain embodiments, the removable skin may be characterized by one of, but is not limited to, the following shapes: cube, sphere, dome, pyramid, cuboid, cone, cylinder, or prism.

In one embodiment, the control mechanism includes external controls 112 which may be characterized by, but is not limited to, buttons, switches, dials, arrows, touch-sensitive, or levers. The control mechanism may include an integrated antenna for sending and receiving radio signals. The control mechanism may include a digital, visual, and/or analog display. The control mechanism may include one or more lights 114 that may be colored or able to change color. The control mechanism control components may be one millimeter to one inch wide and one millimeter to one inch tall. The control mechanism may be one centimeter wide to six inches wide and one centimeter to six inches tall. The external controls 112 may be flush with the control mechanism 108, recessed up to one inch into the housing 102, or extend up to one inch out of the housing 102.

The external controls 112, for example, may comprise a circular on and off button 116 which is circumscribed by a circular temperature control input 118. The temperature control input 118 may be controlled by touch-sense wherein the user moves their finger around the circle, which in turn increases or decreases the temperature depending on whether the user's finger moved clockwise or counterclockwise respectively. Alternatively, the user may press on one side to increase the temperature, or the other to decrease it. Alternatively, temperature control input 118 may be the same button as the one and off button 116, with temperature being controlled by turning the button.

Figure 5:
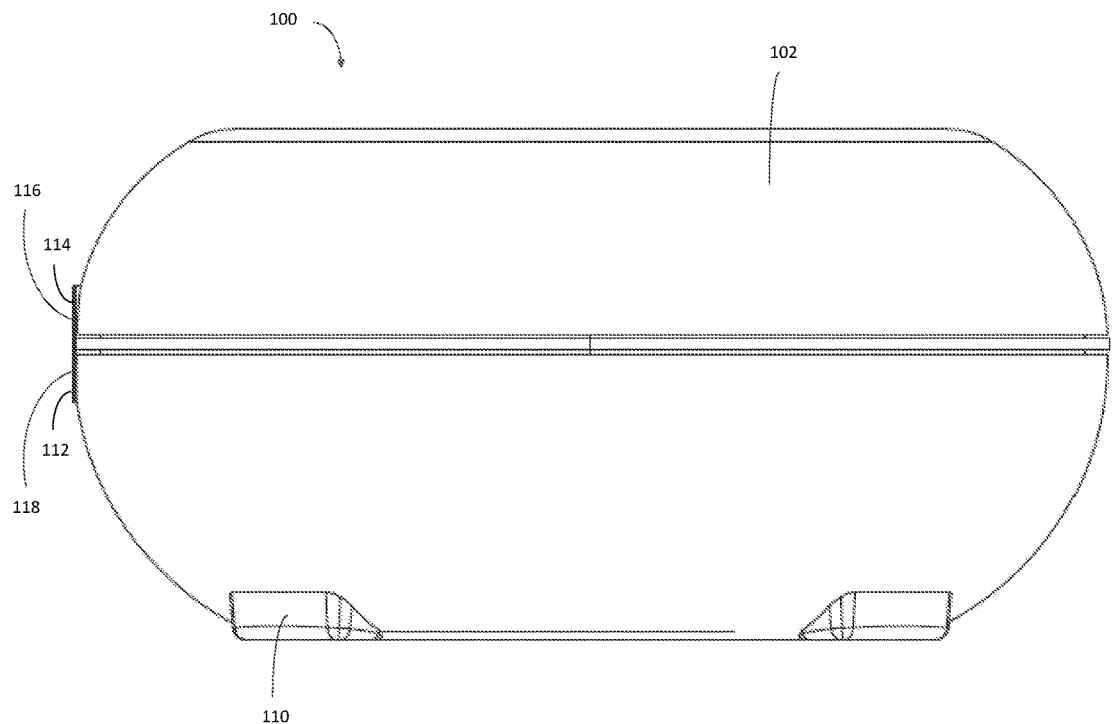
FIG. 5 is a right-side perspective of a depilatory wax melting apparatus, in accordance with an embodiment of the invention.

FIG. 5 is a right-side perspective of a depilatory wax melting apparatus, in accordance with an embodiment of the invention.

In one embodiment, a depilatory wax melting apparatus 100 includes, but is not limited to: a housing 102 that includes at least a receptacle, a heating element in thermal contact with the receptacle, and a control mechanism operable to control the heating element; and a removable skin that is removably placeable on the housing 102 to protect the housing from wax deposits.

The housing 102 may be of any three-dimensional polygonal shape, chosen from, but not limited to, the following: cube, sphere, dome, pyramid, cylinder, cuboid, cone, or prism. The housing 102 may be comprised of a multitude of materials including, but not limited to, metals, plastics, polymers, woods, or ceramics. The housing 102 may be comprised of one or more independent pieces that form a shape. The housing 102 may be approximately two inches to one foot wide and two inches to one foot tall. The housing 102 may include one or more lights that may be colored or able to change color. The housing 102 may include one or more feet 110 for stabilizing the apparatus.

The receptacle may be of any three-dimensional polygonal shape, chosen from, but not limited to, the following: cube, sphere, dome, pyramid, cuboid, cylinder, cone, or prism. The receptacle may be comprised of a multitude of materials including, but not limited to, metals, plastics, polymers, woods, or ceramics. The receptacle may be one inch to one foot wide and one inch to one foot tall.

The heating element may be of any shape chosen from, but not limited to, the following: circle, square, triangle, rectangle, polygon, cube, sphere, dome, pyramid, cuboid, cylinder, cone, or prism. The heating element may be in thermal contact with the bottom of the receptacle. The heating element may conform to the shape of the receptacle. The heating element may be powered by an external power source such as a cable, alternatively the heating element may be powered by an internal power source such as a battery. The heating element may be one inch to six inches wide and from one millimeter to one inch tall. The heating element may be separated from the receptacle by an aluminum plate or other heat conductive material.

In certain embodiments, the removable skin envelopes the entire housing 102 except for the control mechanism and opening of the receptacle. The removable skin may additionally envelope the control mechanism and have inputs for the control mechanism integrated into its structure. The removable skin may removably cover the opening of the receptacle as a lid. The removable skin may be one quarter millimeter to two centimeters thick. In certain embodiments, the removable skin is partially porous. In some embodiments, the removable skin has a texture and/or is comprised of a material that enables it to be self-cleaning. In certain embodiments, the removable skin is comprised of a temperature sensitive material which changes color upon reaching a certain temperature, alerting users when the wax inside has fully melted or is reaching too high of a temperature.

In certain embodiments, the removable skin is shaped to conform to the shape of the housing 102. In other embodiments, the removable skin is shaped such that it drapes over the housing 102 loosely.

In certain embodiments, the removable skin is comprised of a flexible polymer material such as, but not limited to: silicone, plastic or other elastomers. In other embodiments, the removable skin is comprised of a material such as, but not limited to: paper, cardboard, or wood.

In certain embodiments, the removable skin is secured to the portion of the receptacle that is exposed by attaching to the rim of the receptacle via an integrated flange on the skin which forms a seal on the rim of the receptacle. In another embodiment, the removable skin is secured to the housing by an integrated latch in the housing 102 which pinches a portion of the removable skin and secures it. In another embodiment, the removable skin is secured by wrapping around the edge of the housing 102 and adhering to the housing 102 through elastic friction. In other embodiments, the removable skin is secured to the housing 102 by being clamped between two pieces or more of the housing 102.

In certain embodiments, the removable skin may be characterized by one of, but is not limited to, the following shapes: cube, sphere, dome, pyramid, cuboid, cone, cylinder, or prism.

In one embodiment, the control mechanism includes external controls 112 which may be characterized by, but is not limited to, buttons, switches, dials, arrows, touch-sensitive, or levers. The control mechanism may include an integrated antenna for sending and receiving radio signals. The control mechanism may include a digital, visual, and/or analog display. The control mechanism may include one or more lights 114 that may be colored or able to change color. The control mechanism control components may be one millimeter to one inch wide and one millimeter to one inch tall. The control mechanism may be one centimeter wide to six inches wide and one centimeter to six inches tall. The external controls 112 may be flush with the control mechanism 108, recessed up to one inch into the housing 102, or extend up to one inch out of the housing 102.

The external controls 112, for example, may comprise a circular on and off button 116 which is circumscribed by a circular temperature control input 118. The temperature control input 118 may be controlled by touch-sense wherein the user moves their finger around the circle, which in turn increases or decreases the temperature depending on whether the user's finger moved clockwise or counterclockwise respectively. Alternatively, the user may press on one side to increase the temperature, or the other to decrease it. Alternatively, temperature control input 118 may be the same button as the one and off button 116, with temperature being controlled by turning the button.

Figure 6:
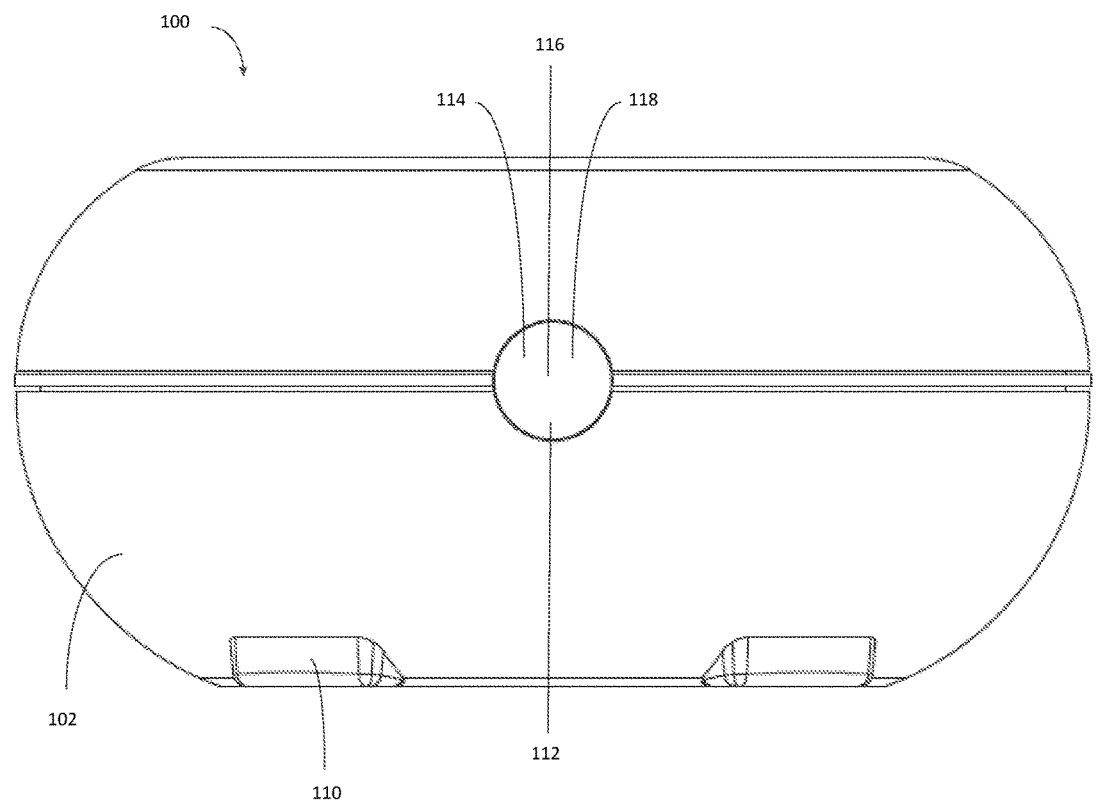
FIG. 6 is a front perspective of a depilatory wax melting apparatus, in accordance with an embodiment of the invention.

FIG. 6 is a front perspective of a depilatory wax melting apparatus, in accordance with an embodiment of the invention.

In one embodiment, a depilatory wax melting apparatus 100 includes, but is not limited to: a housing 102 that includes at least a receptacle, a heating element in thermal contact with the receptacle, and a control mechanism operable to control the heating element; and a removable skin that is removably placeable on the housing 102 to protect the housing from wax deposits.

The housing 102 may be of any three-dimensional polygonal shape, chosen from, but not limited to, the following: cube, sphere, dome, pyramid, cylinder, cuboid, cone, or prism. The housing 102 may be comprised of a multitude of materials including, but not limited to, metals, plastics, polymers, woods, or ceramics. The housing 102 may be comprised of one or more independent pieces that form a shape. The housing 102 may be approximately two inches to one foot wide and two inches to one foot tall. The housing 102 may include one or more lights that may be colored or able to change color. The housing 102 may include one or more feet 110 for stabilizing the apparatus.

The receptacle may be of any three-dimensional polygonal shape, chosen from, but not limited to, the following: cube, sphere, dome, pyramid, cuboid, cylinder, cone, or prism. The receptacle may be comprised of a multitude of materials including, but not limited to, metals, plastics, polymers, woods, or ceramics. The receptacle may be one inch to one foot wide and one inch to one foot tall.

The heating element may be of any shape chosen from, but not limited to, the following: circle, square, triangle, rectangle, polygon, cube, sphere, dome, pyramid, cuboid, cylinder, cone, or prism. The heating element may be in thermal contact with the bottom of the receptacle. The heating element may conform to the shape of the receptacle. The heating element may be powered by an external power source such as a cable, alternatively the heating element may be powered by an internal power source such as a battery. The heating element may be one inch to six inches wide and from one millimeter to one inch tall. The heating element may be separated from the receptacle by an aluminum plate or other heat conductive material.

In certain embodiments, the removable skin envelopes the entire housing 102 except for the control mechanism and opening of the receptacle. The removable skin may additionally envelope the control mechanism and have inputs for the control mechanism integrated into its structure. The removable skin may removably cover the opening of the receptacle as a lid. The removable skin may be one quarter millimeter to two centimeters thick. In certain embodiments, the removable skin is partially porous. In some embodiments, the removable skin has a texture and/or is comprised of a material that enables it to be self-cleaning. In certain embodiments, the removable skin is comprised of a temperature sensitive material which changes color upon reaching a certain temperature, alerting users when the wax inside has fully melted or is reaching too high of a temperature.

In certain embodiments, the removable skin is shaped to conform to the shape of the housing 102. In other embodiments, the removable skin is shaped such that it drapes over the housing 102 loosely.

In certain embodiments, the removable skin is comprised of a flexible polymer material such as, but not limited to: silicone, plastic or other elastomers. In other embodiments, the removable skin is comprised of a material such as, but not limited to: paper, cardboard, or wood.

In certain embodiments, the removable skin is secured to the portion of the receptacle that is exposed by attaching to the rim of the receptacle via an integrated flange on the skin which forms a seal on the rim of the receptacle. In another embodiment, the removable skin is secured to the housing by an integrated latch in the housing 102 which pinches a portion of the removable skin and secures it. In another embodiment, the removable skin is secured by wrapping around the edge of the housing 102 and adhering to the housing 102 through elastic friction. In other embodiments, the removable skin is secured to the housing 102 by being clamped between two pieces or more of the housing 102.

In certain embodiments, the removable skin may be characterized by one of, but is not limited to, the following shapes: cube, sphere, dome, pyramid, cuboid, cone, cylinder, or prism.

In one embodiment, the control mechanism includes external controls 112 which may be characterized by, but is not limited to, buttons, switches, dials, arrows, touch-sensitive, or levers. The control mechanism may include an integrated antenna for sending and receiving radio signals. The control mechanism may include a digital, visual, and/or analog display. The control mechanism may include one or more lights 114 that may be colored or able to change color. The control mechanism control components may be one millimeter to one inch wide and one millimeter to one inch tall. The control mechanism may be one centimeter wide to six inches wide and one centimeter to six inches tall. The external controls 112 may be flush with the control mechanism 108, recessed up to one inch into the housing 102, or extend up to one inch out of the housing 102.

The external controls 112, for example, may comprise a circular on and off button 116 which is circumscribed by a circular temperature control input 118. The temperature control input 118 may be controlled by touch-sense wherein the user moves their finger around the circle, which in turn increases or decreases the temperature depending on whether the user's finger moved clockwise or counterclockwise respectively. Alternatively, the user may press on one side to increase the temperature, or the other to decrease it. Alternatively, temperature control input 118 may be the same button as the one and off button 116, with temperature being controlled by turning the button.

Figure 7:
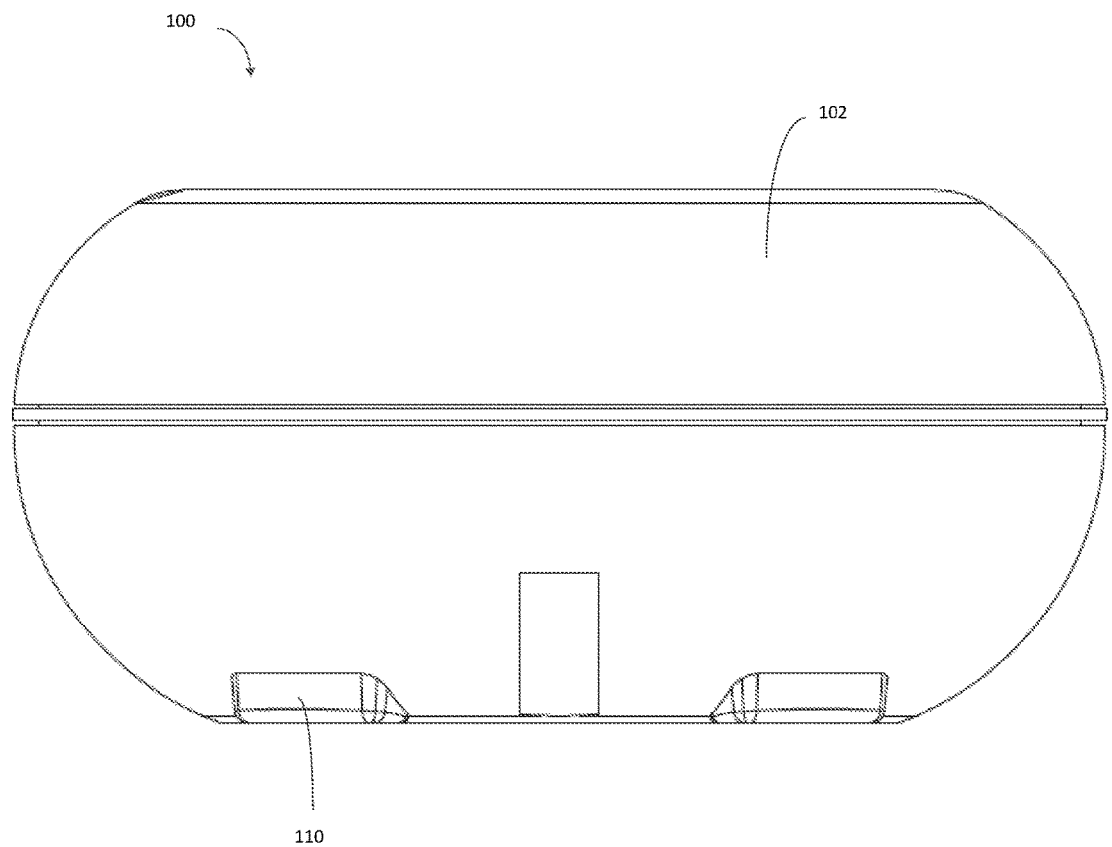
FIG. 7 is a rear perspective of a depilatory wax melting apparatus, in accordance with an embodiment of the invention.

FIG. 7 is a rear perspective of a depilatory wax melting apparatus, in accordance with an embodiment of the invention.

In one embodiment, a depilatory wax melting apparatus 100 includes, but is not limited to: a housing 102 that includes at least a receptacle 104, a heating element in thermal contact with the receptacle 104, and a control mechanism operable to control the heating element; and a removable skin that is removably placeable on the housing 102 to protect the housing from wax deposits.

The housing 102 may be of any three-dimensional polygonal shape, chosen from, but not limited to, the following: cube, sphere, dome, pyramid, cylinder, cuboid, cone, or prism. The housing 102 may be comprised of a multitude of materials including, but not limited to, metals, plastics, polymers, woods, or ceramics. The housing 102 may be comprised of one or more independent pieces that form a shape. The housing 102 may be approximately two inches to one foot wide and two inches to one foot tall. The housing 102 may include one or more lights that may be colored or able to change color. The housing 102 may include one or more feet for stabilizing the apparatus.

The receptacle 104 may be of any three-dimensional polygonal shape, chosen from, but not limited to, the following: cube, sphere, dome, pyramid, cuboid, cylinder, cone, or prism. The receptacle 104 may be comprised of a multitude of materials including, but not limited to, metals, plastics, polymers, woods, or ceramics. The receptacle 104 may be one inch to one foot wide and one inch to one foot tall.

The heating element may be of any shape chosen from, but not limited to, the following: circle, square, triangle, rectangle, polygon, cube, sphere, dome, pyramid, cuboid, cylinder, cone, or prism. The heating element may be in thermal contact with the bottom of the receptacle 104. The heating element may conform to the shape of the receptacle 104. The heating element may be powered by an external power source such as a cable, alternatively the heating element may be powered by an internal power source such as a battery. The heating element may be one inch to six inches wide and from one millimeter to one inch tall. The heating element may be separated from the receptacle 104 by an aluminum plate or other heat conductive material.

In certain embodiments, the removable skin envelopes the entire housing 102 except for the control mechanism and opening of the receptacle 104. The removable skin may additionally envelope the control mechanism and have inputs for the control mechanism integrated into its structure. The removable skin may removably cover the opening of the receptacle 104 as a lid. The removable skin may be one quarter millimeter to two centimeters thick. In certain embodiments, the removable skin is partially porous. In some embodiments, the removable skin has a texture and/or is comprised of a material that enables it to be self-cleaning. In certain embodiments, the removable skin is comprised of a temperature sensitive material which changes color upon reaching a certain temperature, alerting users when the wax inside has fully melted or is reaching too high of a temperature.

In certain embodiments, the removable skin is shaped to conform to the shape of the housing 102. In other embodiments, the removable skin is shaped such that it drapes over the housing 102 loosely.

In certain embodiments, the removable skin is comprised of a flexible polymer material such as, but not limited to: silicone, plastic or other elastomers. In other embodiments, the removable skin is comprised of a material such as, but not limited to: paper, cardboard, or wood.

In certain embodiments, the removable skin is secured to the portion of the receptacle 104 that is exposed by attaching to the rim of the receptacle 104 via an integrated flange on the skin which forms a seal on the rim of the receptacle 104. In another embodiment, the removable skin is secured to the housing by an integrated latch in the housing 102 which pinches a portion of the removable skin and secures it. In another embodiment, the removable skin is secured by wrapping around the edge of the housing 102 and adhering to the housing 102 through elastic friction. In other embodiments, the removable skin is secured to the housing 102 by being clamped between two pieces or more of the housing 102.

In certain embodiments, the removable skin may be characterized by one of, but is not limited to, the following shapes: cube, sphere, dome, pyramid, cuboid, cone, cylinder, or prism.

In one embodiment, the control mechanism includes external controls 112 which may be characterized by, but is not limited to, buttons, switches, dials, arrows, touch-sensitive, or levers. The control mechanism may include an integrated antenna for sending and receiving radio signals. The control mechanism may include a digital, visual, and/or analog display. The control mechanism may include one or more lights 114 that may be colored or able to change color. The control mechanism control components may be one millimeter to one inch wide and one millimeter to one inch tall. The control mechanism may be one centimeter wide to six inches wide and one centimeter to six inches tall. The external controls 112 may be flush with the control mechanism, recessed up to one inch into the housing 102, or extend up to one inch out of the housing 102.

The external controls 112, for example, may comprise a circular on and off button 116 which is circumscribed by a circular temperature control input 118. The temperature control input 118 may be controlled by touch-sense wherein the user moves their finger around the circle, which in turn increases or decreases the temperature depending on whether the user's finger moved clockwise or counterclockwise respectively. Alternatively, the user may press on one side to increase the temperature, or the other to decrease it. Alternatively, temperature control input 118 may be the same button as the one and off button 116, with temperature being controlled by turning the button.

Figure 8:
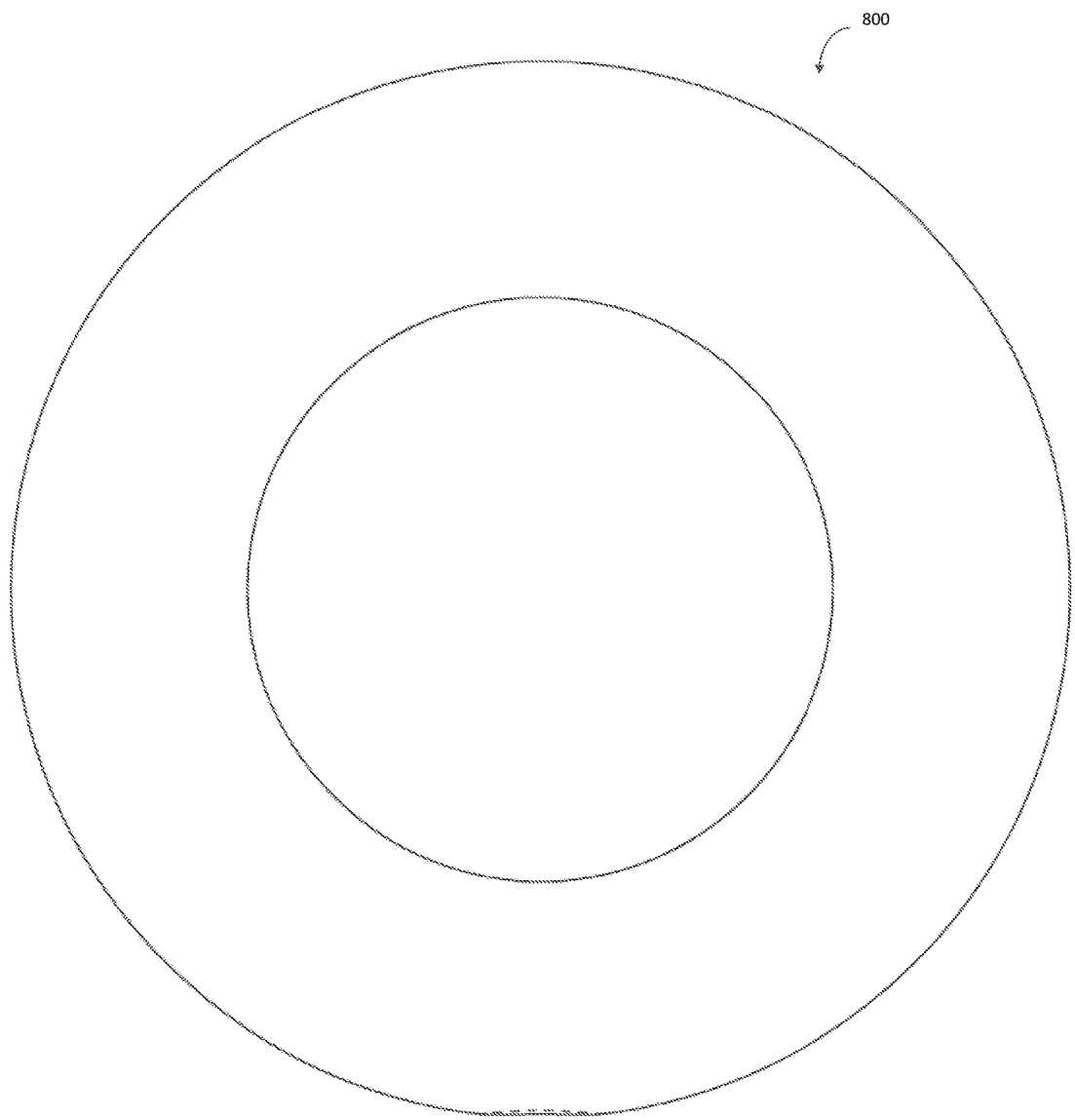
FIG. 8 is a top perspective of the removable skin of a depilatory wax melting apparatus, in accordance with an embodiment of the invention.

FIG. 8 is a top perspective of the removable skin of a depilatory wax melting apparatus, in accordance with an embodiment of the invention.

In one embodiment, a depilatory wax melting apparatus includes, but is not limited to: a housing that includes at least a receptacle, a heating element in thermal contact with the receptacle, and a control mechanism operable to control the heating element; and a removable skin 800 that is removably placeable on the housing to protect the housing from wax deposits.

In certain embodiments, the removable skin 800 is shaped to conform to the shape of the housing. In other embodiments, the removable skin 800 is shaped such that it drapes over the housing loosely.

In certain embodiments, the removable skin 800 is comprised of a flexible polymer material such as, but not limited to: silicone, plastic or other elastomers. In other embodiments, the removable skin 800 is comprised of a material such as, but not limited to: paper, cardboard, or wood.

In certain embodiments, the removable skin 800 is secured to the portion of the receptacle that is exposed by attaching to the rim of the receptacle via an integrated flange on the skin which forms a seal on the rim of the receptacle. In another embodiment, the removable skin 800 is secured to the housing by an integrated latch in the housing which pinches a portion of the removable skin 800 and secures it. In another embodiment, the removable skin 800 is secured by wrapping around the edge of the housing and adhering to the housing through elastic friction. In other embodiments, the removable skin 800 is secured to the housing by being clamped between two pieces or more of the housing.

In certain embodiments, the removable skin 800 may be characterized by one of, but is not limited to, the following shapes: cube, sphere, dome, pyramid, cuboid, cone, cylinder, or prism.

Figure 9:
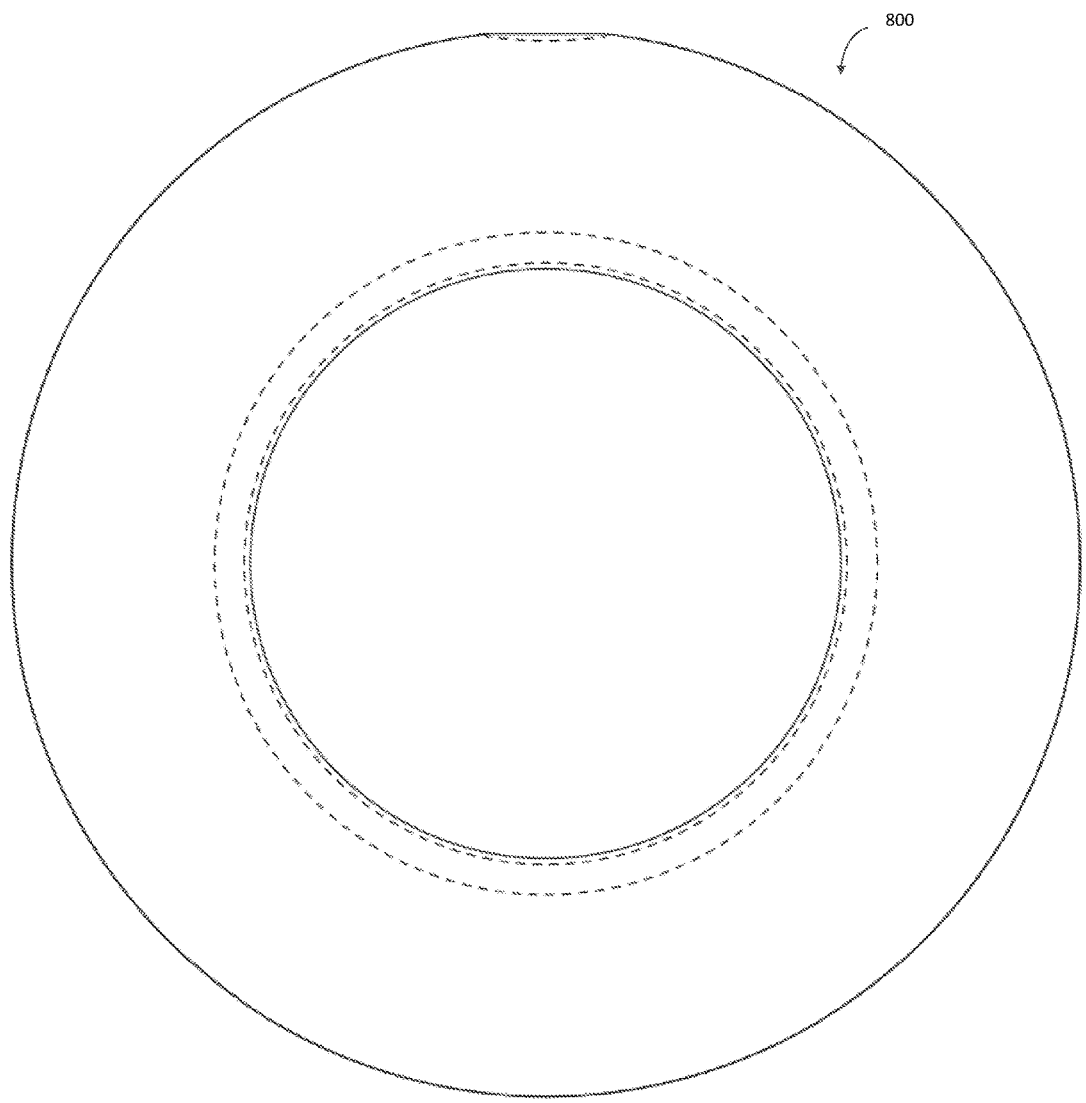
FIG. 9 is a bottom perspective of the removable skin of a depilatory wax melting apparatus, in accordance with an embodiment of the invention.

FIG. 9 is a bottom perspective of the removable skin of a depilatory wax melting apparatus, in accordance with an embodiment of the invention.

In one embodiment, a depilatory wax melting apparatus includes, but is not limited to: a housing that includes at least a receptacle, a heating element in thermal contact with the receptacle, and a control mechanism operable to control the heating element; and a removable skin 800 that is removably placeable on the housing to protect the housing from wax deposits.

In certain embodiments, the removable skin 800 is shaped to conform to the shape of the housing. In other embodiments, the removable skin 800 is shaped such that it drapes over the housing loosely.

In certain embodiments, the removable skin 800 is comprised of a flexible polymer material such as, but not limited to: silicone, plastic or other elastomers. In other embodiments, the removable skin 800 is comprised of a material such as, but not limited to: paper, cardboard, or wood.

In certain embodiments, the removable skin 800 is secured to the portion of the receptacle that is exposed by attaching to the rim of the receptacle via an integrated flange on the skin which forms a seal on the rim of the receptacle. In another embodiment, the removable skin 800 is secured to the housing by an integrated latch in the housing which pinches a portion of the removable skin 800 and secures it. In another embodiment, the removable skin 800 is secured by wrapping around the edge of the housing and adhering to the housing through elastic friction. In other embodiments, the removable skin 800 is secured to the housing by being clamped between two pieces or more of the housing.

In certain embodiments, the removable skin 800 may be characterized by one of, but is not limited to, the following shapes: cube, sphere, dome, pyramid, cuboid, cone, cylinder, or prism.

Figure 10:
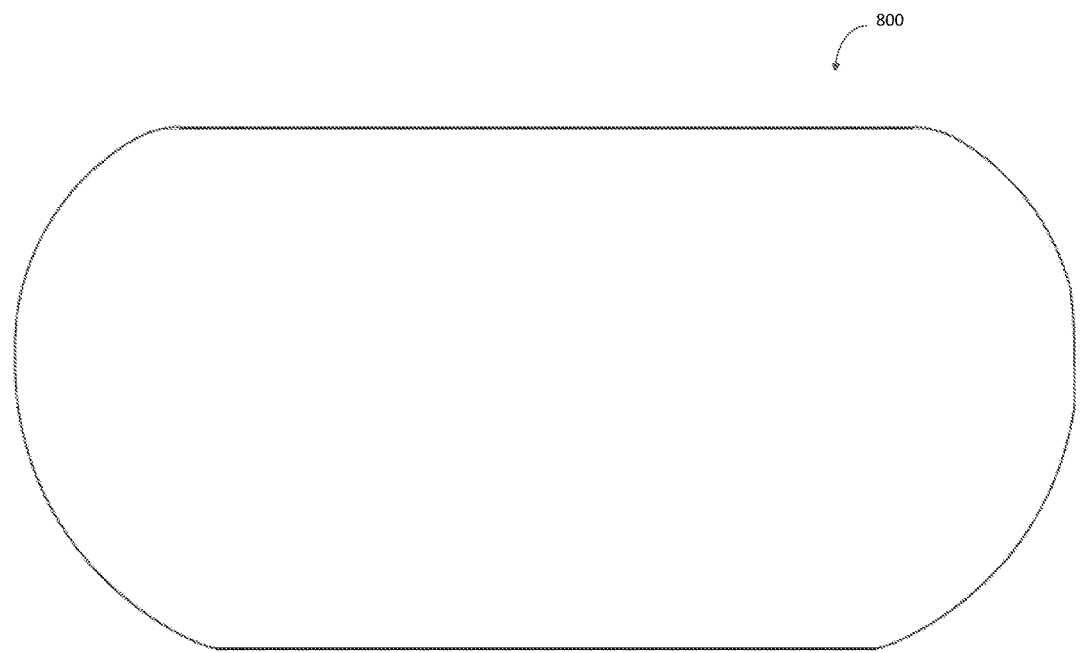
FIG. 10 is a left-side perspective of the removable skin of a depilatory wax melting apparatus, in accordance with an embodiment of the invention.

FIG. 10 is a left-side perspective of the removable skin of a depilatory wax melting apparatus, in accordance with an embodiment of the invention.

In one embodiment, a depilatory wax melting apparatus includes, but is not limited to: a housing that includes at least a receptacle, a heating element in thermal contact with the receptacle, and a control mechanism operable to control the heating element, and a removable skin 800 that is removably placeable on the housing to protect the housing from wax deposits.

In certain embodiments, the removable skin 800 is shaped to conform to the shape of the housing. In other embodiments, the removable skin 800 is shaped such that it drapes over the housing loosely.

In certain embodiments, the removable skin 800 is comprised of a flexible polymer material such as, but not limited to: silicone, plastic or other elastomers. In other embodiments, the removable skin 800 is comprised of a material such as, but not limited to: paper, cardboard, or wood.

In certain embodiments, the removable skin 800 is secured to the portion of the receptacle that is exposed by attaching to the rim of the receptacle via an integrated flange on the skin which forms a seal on the rim of the receptacle. In another embodiment, the removable skin 800 is secured to the housing by an integrated latch in the housing which pinches a portion of the removable skin 800 and secures it. In another embodiment, the removable skin 800 is secured by wrapping around the edge of the housing and adhering to the housing through elastic friction. In other embodiments, the removable skin 800 is secured to the housing by being clamped between two pieces or more of the housing.

In certain embodiments, the removable skin 800 may be characterized by one of, but is not limited to, the following shapes: cube, sphere, dome, pyramid, cuboid, cone, cylinder, or prism.

Figure 11:
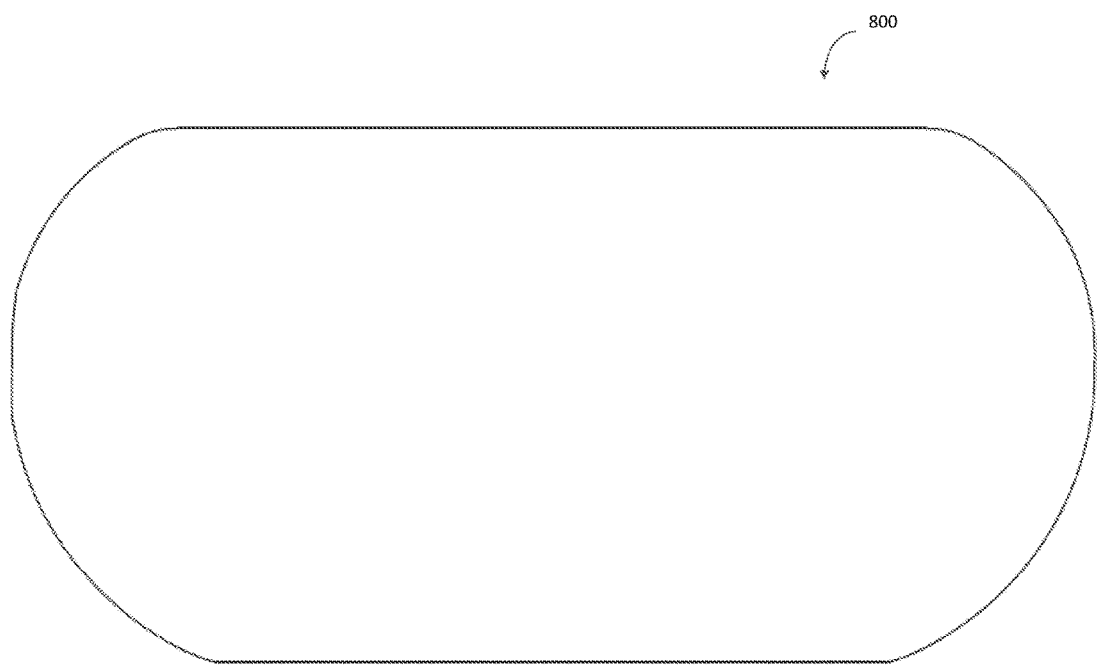
FIG. 11 is a right-side perspective of the removable skin of a depilatory wax melting apparatus, in accordance with an embodiment of the invention.

FIG. 11 is a right-side perspective of the removable skin of a depilatory wax melting apparatus, in accordance with an embodiment of the invention.

In one embodiment, a depilatory wax melting apparatus includes, but is not limited to: a housing that includes at least a receptacle, a heating element in thermal contact with the receptacle, and a control mechanism operable to control the heating element; and a removable skin 800 that is removably placeable on the housing to protect the housing from wax deposits.

In certain embodiments, the removable skin 800 is shaped to conform to the shape of the housing. In other embodiments, the removable skin 800 is shaped such that it drapes over the housing loosely.

In certain embodiments, the removable skin 800 is comprised of a flexible polymer material such as, but not limited to: silicone, plastic or other elastomers. In other embodiments, the removable skin 800 is comprised of a material such as, but not limited to: paper, cardboard, or wood.

In certain embodiments, the removable skin 800 is secured to the portion of the receptacle that is exposed by attaching to the rim of the receptacle via an integrated flange on the skin which forms a seal on the rim of the receptacle. In another embodiment, the removable skin 800 is secured to the housing by an integrated latch in the housing which pinches a portion of the removable skin 800 and secures it. In another embodiment, the removable skin 800 is secured by wrapping around the edge of the housing and adhering to the housing through elastic friction. In other embodiments, the removable skin 800 is secured to the housing by being clamped between two pieces or more of the housing.

In certain embodiments, the removable skin 800 may be characterized by one of, but is not limited to, the following shapes: cube, sphere, dome, pyramid, cuboid, cone, cylinder, or prism.

Figure 12:
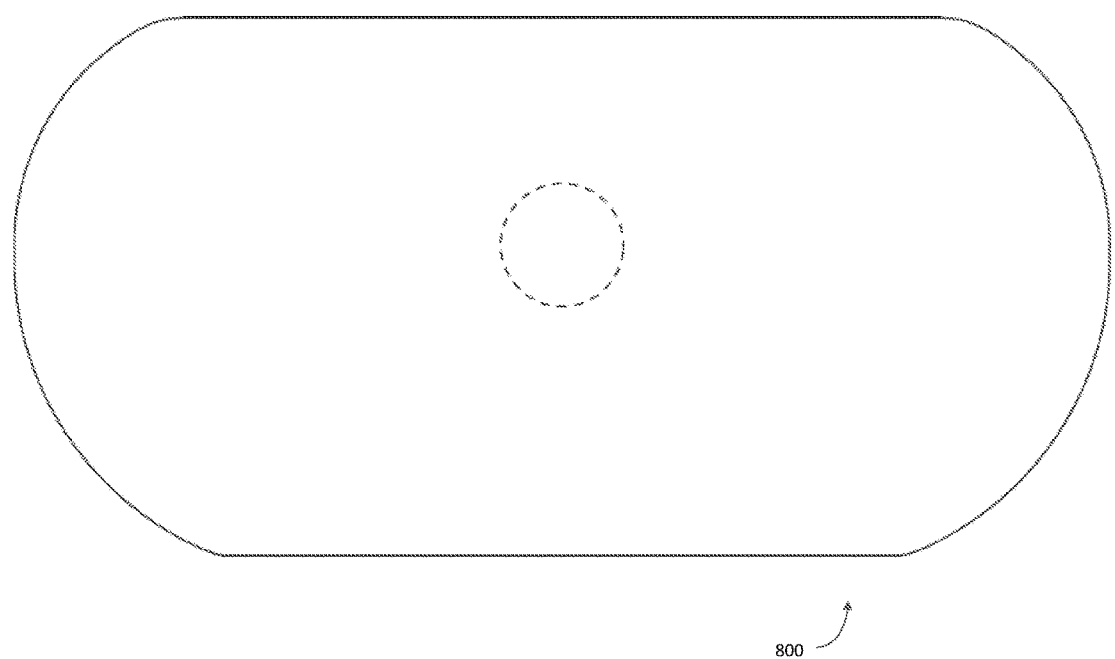
FIG. 12 is a front perspective of the removable skin of a depilatory wax melting apparatus, in accordance with an embodiment of the invention.

FIG. 12 is a top perspective of the removable skin of a depilatory wax melting apparatus, in accordance with an embodiment of the invention.

In one embodiment, a depilatory wax melting apparatus includes, but is not limited to: a housing that includes at least a receptacle, a heating element in thermal contact with the receptacle, and a control mechanism operable to control the heating element, and a removable skin 800 that is removably placeable on the housing to protect the housing from wax deposits.

In certain embodiments, the removable skin 800 is shaped to conform to the shape of the housing. In other embodiments, the removable skin 800 is shaped such that it drapes over the housing loosely.

In certain embodiments, the removable skin 800 is comprised of a flexible polymer material such as, but not limited to: silicone, plastic or other elastomers. In other embodiments, the removable skin 800 is comprised of a material such as, but not limited to: paper, cardboard, or wood.

In certain embodiments, the removable skin 800 is secured to the portion of the receptacle that is exposed by attaching to the rim of the receptacle via an integrated flange on the skin which forms a seal on the rim of the receptacle. In another embodiment, the removable skin 800 is secured to the housing by an integrated latch in the housing which pinches a portion of the removable skin 800 and secures it. In another embodiment, the removable skin 800 is secured by wrapping around the edge of the housing and adhering to the housing through elastic friction. In other embodiments, the removable skin 800 is secured to the housing by being clamped between two pieces or more of the housing.

In certain embodiments, the removable skin 800 may be characterized by one of, but is not limited to, the following shapes: cube, sphere, dome, pyramid, cuboid, cone, cylinder, or prism.

Figure 13:
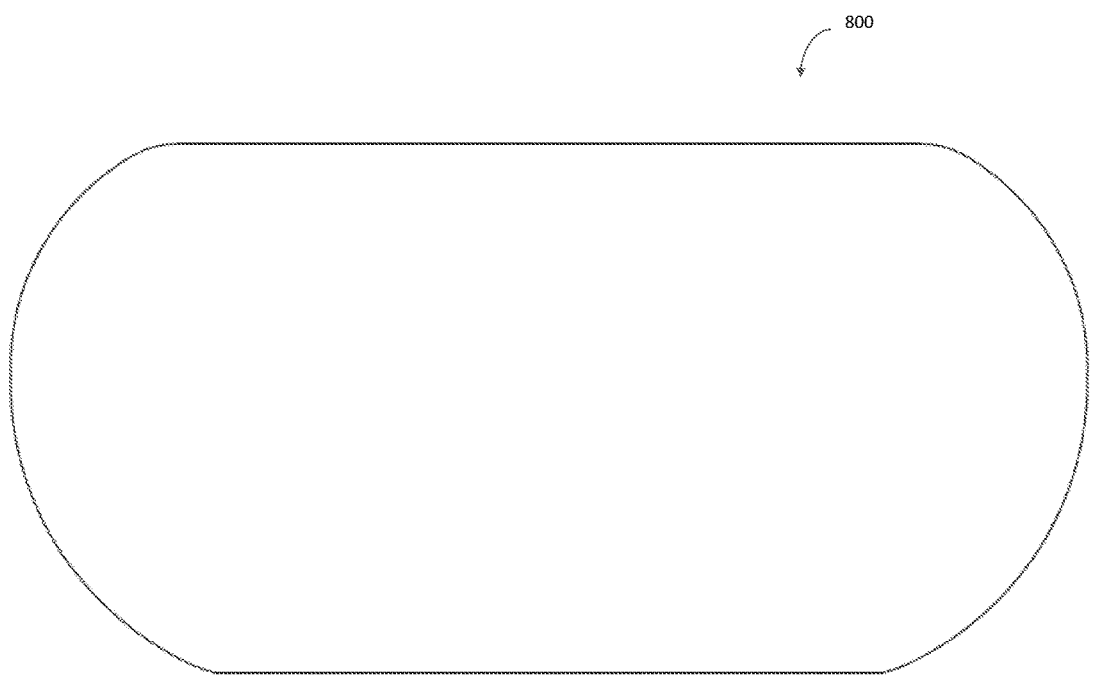
FIG. 13 is a rear perspective of the removable skin of a depilatory wax melting apparatus, in accordance with an embodiment of the invention.

FIG. 13 is a bottom perspective of the removable skin of a depilatory wax melting apparatus, in accordance with an embodiment of the invention.

In one embodiment, a depilatory wax melting apparatus includes, but is not limited to: a housing that includes at least a receptacle, a heating element in thermal contact with the receptacle, and a control mechanism operable to control the heating element, and a removable skin 800 that is removably placeable on the housing to protect the housing from wax deposits.

In certain embodiments, the removable skin 800 is shaped to conform to the shape of the housing. In other embodiments, the removable skin 800 is shaped such that it drapes over the housing loosely.

In certain embodiments, the removable skin 800 is comprised of a flexible polymer material such as, but not limited to: silicone, plastic or other elastomers. In other embodiments, the removable skin 800 is comprised of a material such as, but not limited to: paper, cardboard, or wood.

In certain embodiments, the removable skin 800 is secured to the portion of the receptacle that is exposed by attaching to the rim of the receptacle via an integrated flange on the skin which forms a seal on the rim of the receptacle. In another embodiment, the removable skin 800 is secured to the housing by an integrated latch in the housing which pinches a portion of the removable skin 800 and secures it. In another embodiment, the removable skin 800 is secured by wrapping around the edge of the housing and adhering to the housing through elastic friction. In other embodiments, the removable skin 800 is secured to the housing by being clamped between two pieces or more of the housing.

In certain embodiments, the removable skin 800 may be characterized by one of, but is not limited to, the following shapes: cube, sphere, dome, pyramid, cuboid, cone, cylinder, or prism.

Figure 14:
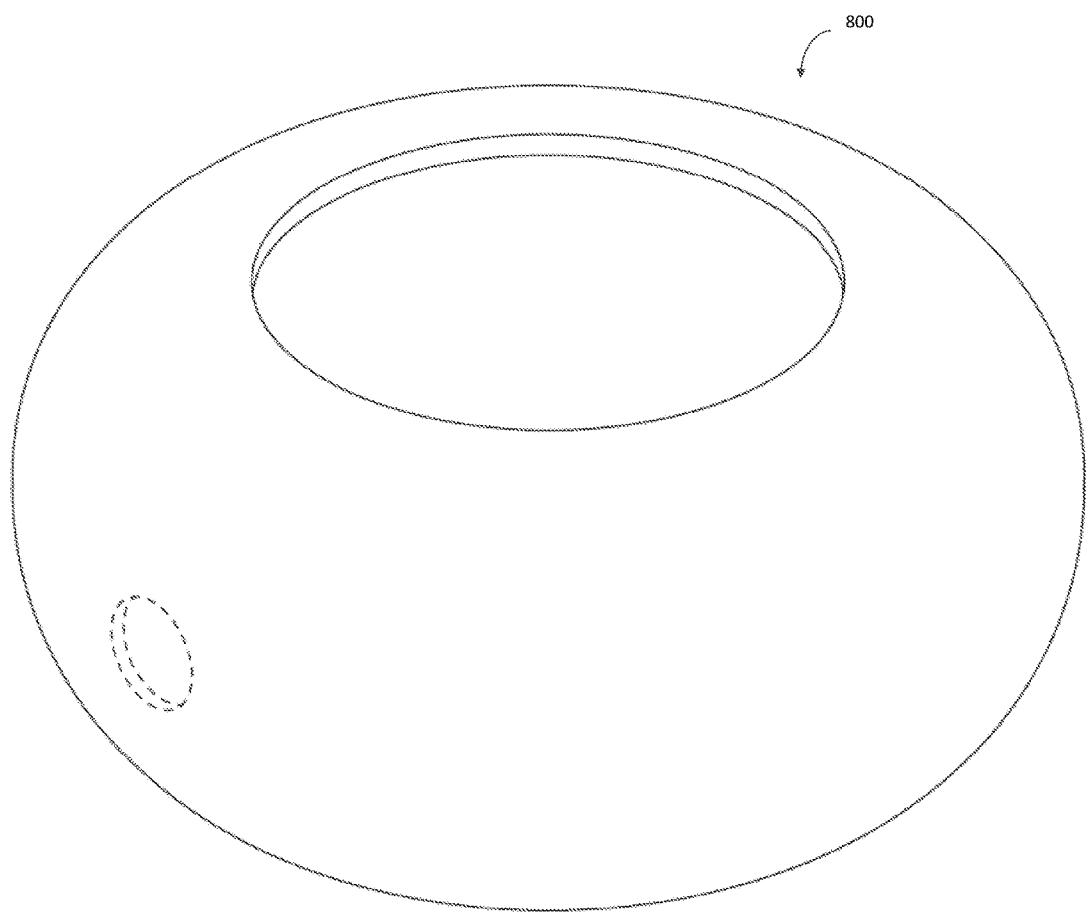
FIG. 14 is an isometric perspective of the removable skin of a depilatory wax melting apparatus, in accordance with an embodiment of the invention.

FIG. 14 is an isometric perspective of the removable skin of a depilatory wax melting apparatus, in accordance with an embodiment of the invention.

In one embodiment, a depilatory wax melting apparatus includes, but is not limited to: a housing that includes at least a receptacle, a heating element in thermal contact with the receptacle, and a control mechanism operable to control the heating element; and a removable skin 800 that is removably placeable on the housing to protect the housing from wax deposits.

In certain embodiments, the removable skin 800 is shaped to conform to the shape of the housing. In other embodiments, the removable skin 800 is shaped such that it drapes over the housing loosely.

In certain embodiments, the removable skin 800 is comprised of a flexible polymer material such as, but not limited to: silicone, plastic or other elastomers. In other embodiments, the removable skin 800 is comprised of a material such as, but not limited to: paper, cardboard, or wood.

In certain embodiments, the removable skin 800 is secured to the portion of the receptacle that is exposed by attaching to the rim of the receptacle via an integrated flange on the skin which forms a seal on the rim of the receptacle. In another embodiment, the removable skin 800 is secured to the housing by an integrated latch in the housing which pinches a portion of the removable skin 800 and secures it. In another embodiment, the removable skin 800 is secured by wrapping around the edge of the housing and adhering to the housing through elastic friction. In other embodiments, the removable skin 800 is secured to the housing by being clamped between two pieces or more of the housing.

In certain embodiments, the removable skin 800 may be characterized by one of, but is not limited to, the following shapes: cube, sphere, dome, pyramid, cuboid, cone, cylinder, or prism.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. An apparatus for the melting of depilatory wax, the apparatus comprising:
    a housing with a top oblate hemispheric portion having an opening defined by an upper circular rim, and the top oblate hemispheric portion includes a bottom circular edge and a first recess disposed along the bottom circular edge;
    the housing further includes a bottom oblate hemispheric portion that is substantially symmetrical to top oblate hemispheric portion, and the bottom oblate hemispheric portion includes an upper circular edge and a second recess disposed along the upper circular edge;
    an interface ring that is positioned equatorially between the bottom circular edge of the top oblate hemispheric portion and the upper circular edge of the bottom oblate hemispheric portion, and the interface ring includes a circular control opening which is received between the first recess of the top oblate hemispheric portion and the second recess of the bottom oblate hemispheric portion;
    a receptable that is positioned within the housing and that is exposed via the opening in the top oblate hemispheric portion;
    a heating element in thermal contact with the receptacle;
    a control mechanism disposed in the circular control opening and the control mechanism being operable to control the heating element; and
    a wax repellant skin composed of silicone rubber that is molded in an oblate spherical shape with a first aperture corresponding to the opening defined by the upper circular rim in the top oblate hemispheric portion and a second aperture corresponding to the circular control opening, the wax repellant skin being removably placeable around the top oblate hemispheric portion and the bottom oblate hemispheric portion.

2. The apparatus of claim 1, wherein the wax repellant skin is secured to the receptacle.

3. The apparatus of claim 1, wherein the wax repellant skin is secured to the housing by partially enveloping the opening.

4. The apparatus of claim 1, wherein the receptacle is cylindrical.

5. The apparatus of claim 1, wherein the control mechanism is a circular button.

6. The apparatus of claim 1, wherein the control mechanism is a dial.

7. The apparatus of claim 1, wherein the control mechanism includes one or more lights.

8. The apparatus of claim 1, wherein the bottom oblate hemispheric portion includes one or more feet.

9. The apparatus of claim 1, wherein the opening in the top oblate hemispheric portion is circular.

10. The apparatus of claim 1, wherein the wax repellant skin further includes a third aperture on a bottom end.

11. The apparatus of claim 1, wherein the housing is at least partially composed of wood.

12. The apparatus of claim 1, wherein the control mechanism comprises an on/off button circumscribed by a temperature control dial.

13. The apparatus of claim 1, wherein the wax repellant skin changes colors based on temperature.

14. The apparatus of claim 7, further comprising:
    the one or more lights that change color based on temperature.

* * * * *